US009376564B2

(12) United States Patent
Hupka et al.

(10) Patent No.: US 9,376,564 B2
(45) Date of Patent: *Jun. 28, 2016

(54) POLYURETHANE CASTING RESINS AND POTTING COMPOUNDS PRODUCED THEREFROM

(71) Applicant: Bayer MaterialScience AG, Leverkusen (DE)

(72) Inventors: Florian Hupka, Düsseldorf (DE); Marcel Schornstein, Neuss (DE); Dirk Wegener, Monheim (DE); Harald Rasselnberg, Dormagen (DE); Erhard Michels, Stade (DE)

(73) Assignee: Covestro Deutschland AG (DE)

(*) Notice: Subject to any disclaimer, the term of this patent is extended or adjusted under 35 U.S.C. 154(b) by 0 days.

This patent is subject to a terminal disclaimer.

(21) Appl. No.: 14/422,204

(22) PCT Filed: Aug. 16, 2013

(86) PCT No.: PCT/EP2013/067160

§ 371 (c)(1),
(2) Date: Feb. 18, 2015

(87) PCT Pub. No.: WO2014/029700

PCT Pub. Date: Feb. 27, 2014

(65) Prior Publication Data

US 2015/0225566 A1 Aug. 13, 2015

(30) Foreign Application Priority Data

Aug. 20, 2012 (EP) .................................... 12180969

(51) Int. Cl.

| | |
|---|---|
| ***C08L 75/04*** | (2006.01) |
| ***C08G 18/28*** | (2006.01) |
| ***C08G 18/58*** | (2006.01) |
| ***C08L 79/04*** | (2006.01) |
| ***C08G 18/40*** | (2006.01) |
| ***C08L 63/00*** | (2006.01) |

(52) U.S. Cl.

CPC ............. *C08L 79/04* (2013.01); *C08G 18/4045* (2013.01); *C08G 18/58* (2013.01); *C08L 63/00* (2013.01); *C08L 75/04* (2013.01); *C08L 2205/03* (2013.01)

(58) Field of Classification Search

None

See application file for complete search history.

(56) References Cited

U.S. PATENT DOCUMENTS

| | | | | |
|---|---|---|---|---|
| 4,726,868 | A | 2/1988 | Goel et al. | |
| 5,071,939 | A | 12/1991 | Fukami et al. | |
| 5,223,598 | A * | 6/1993 | Yamada | C08G 18/165 528/48 |
| 5,714,565 | A * | 2/1998 | Nodelman | C08G 18/1875 524/770 |
| 2013/0244520 | A1 | 9/2013 | Lindner et al. | |
| 2015/0218375 | A1* | 8/2015 | Hupka | C08G 18/58 523/400 |

FOREIGN PATENT DOCUMENTS

| | | | |
|---|---|---|---|
| DE | 102008054940 | A1 | 7/2009 |
| EP | 0148344 | A1 | 7/1985 |
| EP | 1471088 | A2 | 10/2004 |
| WO | WO-2012022683 | A1 | 2/2012 |

OTHER PUBLICATIONS

International Search Report for PCT/EP2013/067160 mailed Jan. 16, 2014.

* cited by examiner

*Primary Examiner* — Michael J Feely

(74) *Attorney, Agent, or Firm* — Drinker Biddle & Reath LLP

(57) ABSTRACT

The invention relates to polyurethane casting resins for producing polyurethane potting compounds, which can be obtained from a reaction mixture of polyisocyanates, polyepoxides, polyols, latent catalysts and optionally additives. The invention also relates to a method for producing said compounds.

2 Claims, No Drawings

POLYURETHANE CASTING RESINS AND POTTING COMPOUNDS PRODUCED THEREFROM

CROSS-REFERENCE TO RELATED APPLICATIONS

This application is a national stage application (under 35 U.S.C. §371) of PCT/EP2013/067160, filed Aug. 16, 2013, which claims benefit of European Application No. 12180969.3, filed Aug. 20, 2012, both of which are incorporated herein by reference in their entirety.

The present invention relates to polyurethane casting resins for production of polyurethane potting compounds, obtainable from a reaction mixture of polyisocyanates, polyepoxides, polyols, latent catalysts and optionally additives, and to a process for production thereof.

Potting compounds are frequently used for protection of electrotechnical components and circuits, for example transformers, insulators and capacitors, or of open contact sites in cables and wires for prevention of harmful environmental influences. The matrix material typically consists of unsaturated polyester, vinyl ester, polyurethane or epoxy resins.

Potting compounds are used, for example, in the automobile industry, in the construction sector or in the electrical industry, but also in environmental technology and for the construction of alternative power generation plants. High demands are made on the potting compound, i.e. on the casting resin. For instance, the casting resin has to have a low processing viscosity, combined with a long pot life, in order to fill all the interstices without cavities and bubbles, particularly in large systems. The glass transition temperature and hence also the heat distortion resistance should be very high, in order to have a very substantially constant profile of properties over the use temperature range. In spite of the long pot life, the casting resin should additionally have a short curing time, in order to avoid long heat treatment cycle times and thus to guarantee economic viability.

While casting resins based on epoxy resins have pot lives of up to one hour, such that parts of moderate and high volume can be produced therewith as well, those based on polyurethane (PUR-based) generally have very short pot lives, frequently of only a few minutes. Therefore, these PUR casting resins can generally be used only for small-volume moldings by means of casting machines. The hot-curing epoxy-based casting resins specifically for large-volume windings contain typically about 65 percent by weight of filler, for example quartz flour, aluminum oxide or wollastonite. Specifically because of the high filler contents, it is necessary that the casting resin has a low viscosity. The higher the filler content, the poorer the flow characteristics and hence the property of being able to fill without cavities and bubbles.

EP 1471088 A2 describes polyurethane formulations based on polyisocyanates and amine-started polyol compounds, which have improved processing characteristics because of a rapid onset of compatibility of the raw material components in the mixing operation, and the use thereof for production of castings, embedding compounds, laminates and coatings. The polyurethane casting resins described have long pot lives of up to one hour. However, a disadvantage here is that the casting resins have to be cured at room temperature for 16 hours and then have to be heat-treated at 80° C. for a further 8 hours, in order to avoid what are called shell cracks in the finished potting moldings. The glass transition temperatures are additionally very low at below 120° C.

DE 102008054940 A1 describes casting resins based on polyurethanes formed from two components, wherein specific polyester alcohols are reacted with polyisocyanates, essentially without catalysts. The resulting pot life is 22 minutes; the demolding time is very long at 63 minutes. Since the temperature rises to about 83° C. in the curing operation and the potting mold is not heated, it can be assumed that the glass transition temperature is not more than 100° C. and is thus very low.

The polyurethane casting resins described and used to date have the disadvantage that i) the pot lives are too short for large-volume moldings
ii) it takes too long before the casting resin has cured, which leads to low productivity
iii) long heat treatment cycles have to be run through, in order to fully cure the casting resins and in order to avoid cracking or deformation of the potting compounds
iv) the glass transition temperatures are too low for many applications
v) the potting compounds do not have a high flame retardancy.

Pot life is understood to mean the duration of processability of the reactive system.

It was therefore an object of the present invention to provide a matrix material for production of potting compounds which does not have the aforementioned disadvantages and nevertheless has the high mechanical and electrical properties of customary potting compounds, and a process for producing such potting compounds.

This object was surprisingly achieved through casting resins formed from a PUR matrix material (reaction mixture) obtainable from polyisocyanates, polyepoxides, polyols, latent catalysts and optionally customary additives, with a large excess of isocyanate groups present in relation to the number of OH groups.

The invention provides potting compounds based on polyisocyanurate and on polyurethane, wherein the polyurethane and polyisocyanurate are obtainable from a reaction mixture consisting of A) one or more polyisocyanates
B) one or more polyols
C) one or more polyepoxides
D) one or more latent catalysts
E) optionally additives and
F) optionally fillers, wherein the mixture without fillers has a viscosity at 25° C. of 20 to 500 mPas, preferably of 50 to 400 mPas, more preferably of 60 to 350 mPas (measured to DIN EN ISO 1342), a ratio of the number of NCO groups in component A) to the number of OH groups in component B) of 10:1 to 16:1, preferably of 11:1 to 14:1, a ratio of the number of NCO groups in component A) to the number of epoxy groups in component C) of 2:1 to 25:1, preferably of 7:1 to 15:1, most preferably of 10:1 to 14:1, and a ratio of the number of epoxy groups in component C) to the number of moles of latent catalyst in component D) of 1.1:1 to 12:1, preferably of 3:1 to 10:1, most preferably of 5:1 to 7:1.

Polyisocyanurates (PIR) form through the trimerization of isocyanate groups. The isocyanurate ring is very stable. At the start, the isocyanates react preferably with polyols to give polyurethanes. Later, when most of the OH groups have reacted, there is polyisocyanurate formation. The inventive potting compounds are optically transparent and have good heat stability.

The polyurethane/polyisocyanurate does not contain any oxazolidinone groups in principle. If, contrary to expectation, oxazolidinone groups should actually occur in the polyurethane/polyisocyanurate as a result of minor side reaction, the content thereof is below 5% by weight based on polyurethane/polyisocyanurate. The oxazolidinone groups form when polyisocyanates react with epoxides. These are not disruptive in the potting component.

The viscosity is determined to DIN EN ISO 1342 and in accordance with the details in the examples section.

Various additives can be added to the casting resins. Fillers added as additives are fine-grain, usually mineral substances, such as quartz flour, sand, chalk, short glass or textile fibers, which increase mechanical stability and reduce shrinkage in the course of curing and the coefficient of expansion of the finished molded material. Moreover, these additions frequently reduce the cost of the casting resin, reduce the tendency to burn and usually also improve the heat conduction. These advantages are paid for through more difficult processing, since the viscosity of the resin increases as a result, and the filler can sediment. In industrial processing in casting plants, the filler generally also leads to higher wear on the plants. Moreover, it is also possible to use various pigments which ensure the desired coloring of the casting resin.

The filler content in the potting compound is preferably more than 40% by weight to 80% by weight, more preferably more than 55% by weight to 65% by weight, based on the total weight of the potting compound.

The casting resin (the reaction mixture) is cured at a temperature of 50° C. to 170° C., preferably of 110° C. to 140° C.

The polyurethane reaction mixtures used in accordance with the invention have low viscosities, very long pot lives and short curing times at low curing temperatures, and thus enable rapid production.

A further advantage of the mixtures used in accordance with the invention is the improved processing characteristics as a result of direct compatibility of the mixture of polyol and polyepoxide with the polyisocyanate. In the systems used to date, composed of polyisocyanates and polyols, the components have to be mixed beforehand for several minutes, since it is only through the commencement of urethane formation that compatibility of the components and homogeneity of the mixture is achieved, which is necessary for the processing. Otherwise, there would be incomplete curing and inhomogeneous products. The components of the reaction mixtures used in accordance with the invention can be mixed at 20 to 100° C., preferably at 25 to 70° C., and then processed further.

In order to fill all the interstices without cavities and bubbles, the polyurethane reaction mixture in the filling operations should preferably be mobile and remain mobile for a maximum period. This is necessary particularly in the case of large components, since the filling time is very long here. Preferably, the viscosity of the inventive unfilled polyurethane reaction mixtures at 25° C. directly after mixing is between 20 and 500 mPas, preferably between 50 and 400 mPas, more preferably between 60 and 350 mPas. Preferably, the viscosity of the inventive unfilled reaction mixtures at a constant temperature of 25° C. 30 minutes after the components have been mixed is less than 800 mPas, preferably less than 500 mPas and more preferably less than 300 mPas. The viscosity was determined 30 minutes after the components had been mixed at a constant temperature of 25° C. with a rotary viscometer at a shear rate of 60 l/s.

In the case of optimal use of fillers, a low viscosity of the reaction mixture is likewise advantageous, such that a good material flow rate is still assured in addition to the possibility of a high filler content.

The reaction mixtures used in accordance with the invention can be processed on casting machines with static mixers or with dynamic mixers, since only a short mixing time is required. This is highly advantageous in the production of the inventive potting compounds, since the reaction mixture must have maximum mobility for good material flow. A noninventive mixture which has to be mixed for a few minutes beforehand already exhibits too high a viscosity as a result of the formation of urethane groups and the resulting exothermicity, which can lead to incomplete curing of the mixture.

A further advantage of the reaction mixture used in accordance with the invention is that it can be processed in a one-stage process, and that a low curing temperature of 50° C. to 170° C. is sufficient. Moreover, the cured potting compounds can be demolded very quickly if required, without occurrence of cracking or deformation in the potting component.

The inventive potting compounds based on polyisocyanurate and on polyurethane can be produced by producing a reaction mixture consisting of A) one or more polyisocyanates
B) one or more polyols
C) one or more polyepoxides
D) one or more latent catalysts and
E) optionally additives and
F) optionally fillers and curing said reaction mixture, wherein the reaction mixture without fillers has a viscosity at 25° C. of 20 to 500 mPas, preferably of 50 to 400 mPas, more preferably of 60 to 350 mPas (measured to DIN EN ISO 1342), a ratio of the number of NCO groups in component A) to the number of OH groups in component B) of 10:1 to 16:1, preferably of 11:1 to 14:1, a ratio of the number of NCO groups in component A) to the number of epoxy groups in component C) of 2:1 to 25:1, preferably of 7:1 to 15:1, most preferably of 10:1 to 14:1, and a ratio of the number of epoxy groups in component C) to the number of moles of latent catalyst in component D) of 1.1:1 to 12:1, preferably of 3:1 to 10:1, most preferably of 5:1 to 7:1.

As polyisocyanate component A), the customary aliphatic, cycloaliphatic and especially aromatic di- and/or polyisocyanates are used. Examples of such suitable polyisocyanates are butylene 1,4-diisocyanate, pentane 1,5-diisocyanate, hexamethylene 1,6-diisocyanate (HDI), isophorone diisocyanate (IPDI), 2,2,4- and/or 2,4,4-trimethylhexamethylene diisocyanate, the isomeric bis(4,4'-isocyanatocyclohexyl)methanes or mixtures thereof with any isomer content, cyclohexylene 1,4-diisocyanate, phenylene 1,4-diisocyanate, tolylene 2,4- and/or 2,6-diisocyanate (TDI), naphthylene 1,5-diisocyanate, diphenylmethane 2,2'- and/or 2,4'- and/or 4,4'-diisocyanate (MDI) and/or higher homologs (pMDI), 1,3- and/or 1,4-bis(2-isocyanatoprop-2-yl)benzene (TMXDI), 1,3-bis(isocyanatomethyl)benzene (XDI). As well as the aforementioned polyisocyanates, it is also possible to use proportions of modified polyisocyanates having uretdione, isocyanurate, urethane, carbodiimide, uretonimine, allophanate or biuret structure. Isocyanates used are preferably diphenylmethane diisocyanate (MDI) and especially mixtures of diphenylmethane diisocyanate and polyphenylenepolymethylene polyisocyanate (pMDI). The mixtures of diphenylmethane diisocyanate and polyphenylenepolymethylene polyisocyanate (pMDI) have a preferred monomer content of between 60% and 100% by weight, preferably between 70% and 95% by weight, more preferably between 80% and 90% by weight. The NCO content of the polyisocyanate used should preferably be more than 25% by weight, more preferably more than 30% by weight, especially preferably more than 32% by weight. The NCO content can be determined to DIN 53185. The viscosity of isocyanate should preferably be ≤250 mPas (at 25° C.), more preferably ≤50 mPas (at 25° C.) and especially preferably ≤30 mPas (at 25° C.).

The polyols B) may have, for example, a number-average molecular weight $M_n$ of ≥200 g/mol to ≤8000 g/mol, preferably of ≥500 g/mol to ≤5000 g/mol and more preferably of ≥1000 g/mol to ≤3000 g/mol. The OH number of component B) in the case of a single added polyol is its OH number. In the case of mixtures, the number-average OH number is reported. This value can be determined with reference to DIN 53240. The polyol formulation preferably contains, as polyols, those which have a number-average OH number of 25 to 1000 mg KOH/g, preferably of 30 to 400 mg KOH/g and more preferably of 40 to 80 mg KOH/g. The viscosity of the polyols is preferably ≤800 mPas (at 25° C.). The polyols preferably have at least 60% secondary OH groups, preferably at least 80% secondary OH groups and more preferably 90% secondary OH groups. Polyether polyols based on propylene oxide are particularly preferred. Preferably, the polyols used have a mean functionality of 1.8 to 4.0, more preferably 1.9 to 2.5.

According to the invention, it is possible to use polyether polyols, polyester polyols or polycarbonate polyols. Suitable polyether polyols are addition products of styrene oxide, ethylene oxide, propylene oxide and/or butylene oxide onto di- or polyfunctional starter molecules. Suitable starter molecules are, for example, water, ethylene glycol, diethylene glycol, butyl diglycol, glycerol, trimethylolpropane, propylene glycol, pentaerythritol, ethylenediamine, toluenediamine, triethanolamine, butane-1,4-diol, hexane-1,6-diol and low molecular weight hydroxyl-containing esters of such polyols with dicarboxylic acids or oils having hydroxyl groups.

The polyols B) may contain fillers and polymers.

Polyepoxides C) of particularly good suitability are low-viscosity aliphatic, cycloaliphatic or aromatic epoxides and mixtures thereof. The polyepoxides can be prepared by reaction of epoxides, for example epichlorohydrin, with alcohols. Alcohols used may, for example, be bisphenol A, bisphenol F, bisphenol S, cyclohexanedimethanol, phenol-formaldehyde resins, cresol-formaldehyde novolaks, butanediol, hexanediol, trimethylolpropane or polyether polyols. It is also possible to use glycidyl esters, for example of phthalic acid, isophthalic acid or terephthalic acid and mixtures thereof. Epoxides can also be prepared through the epoxidation of organic compounds containing double bonds, for example through the epoxidation of fatty oils, such as soya oil, to epoxidized soya oil. The polyepoxides may also contain monofunctional epoxides as reactive diluents. These can be prepared by the reaction of alcohols with epichlorohydrin, for example monoglycidyl ethers of C4-C18 alcohols, cresol, p-tert-butylphenol. Further usable polyepoxides are described, for example, in "Handbook of Epoxy resins" by Henry Lee and Kris Neville, McGraw-Hill Book Company, 1967. Preference is given to using glycidyl ethers of bisphenol A having an epoxy equivalent weight in the range of 170-250 g/eq, more preferably having an epoxy equivalent weight in the range from 176 to 196 g/eq. The epoxy equivalent weight can be determined to ASTM D-1652. For example, it is possible for this purpose to use Eurepox 710 or Araldite® GY-250.

Latent catalysts D) used with preference are catalytically active in the range between 50° C. and 120° C. Typical latent catalysts are, for example blocked amine and amidine catalysts from the manufacturers Air Products (for example Polycat® SA-1/10, Dabco KTM 60) and Tosoh Corporation (for example Toyocat® DB 2, DB 30, DB 31, DB 40, DB 41, DB 42, DB 60, DB 70) and Huntsman Corporation (for example Accelerator DY 9577). It is also possible to use all other typical latent catalysts from polyurethane chemistry having a so-called switching temperature of 50° C. to 120° C.

Latent catalysts D) used may be the known catalysts, usually bases (tertiary amines, salts of weak acids such as potassium acetate) and organic metal compounds. Preferred latently reactive catalysts are salts of tertiary amines. These latently reactive catalysts can be obtained, for example, by chemical blocking of a catalytically active amine. The chemical blocking can be effected by the protonation of a tertiary amine with an acid, for example formic acid, acetic acid, ethylhexanoic acid or oleic acid, or of a phenol or by boron trichloride. Trialkylamines and heterocyclic amines may be used as the amine, for example trimethylamine, triethylamine, tripropylamine, tributylamine, dimethylcyclohexylamine, dimethylbenzylamine, dibutylcyclohexylamine, dimethylethanolamine, triethanolamine, diethylethanolamine, ethyldiethanolamine, dimethylisopropanolamine, dimethyloctylamine, triisopropanolamine, triethylenediamine, tetramethyl-1,3-butanediamine, N,N,N',N'-tetramethylethylenediamine, N,N,N',N'-tetramethylhexane-1,6-diamine, N,N,N',N',N"-pentamethyldiethylenetriamine, bis(2-dimethylaminoethoxy)methane, N,N,N'-trimethyl-N'-(2-hydroxyethyl)ethylenediamine, N,N-dimethyl-N',N'-(2-hydroxyethyl)ethylenediamine, tetramethylguanidine, N-methylpiperidine, N-ethylpiperidine, N-methylmorpholine, N-ethylmorpholine, 1,4-dimethylpiperidine, 1,2,4-trimethylpiperidine, N-(2-dimethylaminoethyl)morpholine, 1-methyl-4-(2-dimethylamino)piperidine, 1,4-diazabicyclo[2.2.2]octane, 1,8-diazabicyclo[5.4.0]undec-7-ene and 1,5-diazabicyclo[4.3.0]-5-nonane.

Examples of commercially available latently reactive catalysts are Polycat® SA1/10 (phenol-blocked 1,8-diazabicyclo[5.4.0]undec-7-ene (=DBU)), Polycat® SA 102/10, DABCO® 8154 (formic acid-blocked triethylenediamine) or DABCO® WT. Particular preference is given to trichloro(N,N-dimethyloctylamino)boron.

It is optionally possible to add additives E). These are, for example, additional catalysts, deaerators, defoamers, inhibitors, fillers and reinforcers. Further known additives and additions can be used if required. Plasticizers added to the reaction mixture additionally enable an increase in the elasticity of the potting compound. Additives such as defoamers, viscosity modifiers and adhesion promoters can likewise improve the final properties and processing properties. These components are either added separately or are already present in the polyol component.

To improve fire resistance, flame retardants are optionally added to the matrix, for example phosphorus compounds, in particular phosphates and phosphonates, and also halogenated polyesters and polyols or chloroparaffins. In addition, it is also possible to add nonvolatile flame retardants such as melamine or expandable graphite, which expands significantly when exposed to flames and in the process seals the surface from further heating.

The inventive casting resins can be used for potting of electronic components and circuits and hence for the protection thereof, for example transformers, insulators, capacitors, semiconductors, cables and wires, in the automobile industry, in the construction sector, but also in environmental technology and for the construction of alternative power generation plants.

The invention is to be illustrated in more detail by the examples which follow.

EXAMPLES

Inventive casting resins composed of polyisocyanates, polyols, polyepoxides and latent catalysts were produced and compared with noninventive casting resins composed of polyisocyanates, polyols, polyepoxides and latent catalysts.

For the production of filled potting compounds, about 60% by weight of Millisil W-12® (from Quarzwerke), based on the later compound, was incorporated into the reaction mixture. Both the filled and the unfilled reaction mixture were introduced into a closed mold heated to 130° C., and the finished potting component was demolded on completion of curing.

The mechanical and electrical measurements were made on the potting compounds. The filler content was determined by ashing the specimens to DIN EN ISO 1172. Flexural strength and flexural elongation was determined by a 3-point bending test to DIN EN ISO 178.

Viscosity was determined directly after mixing and 60 minutes after mixing of the components with a rotary viscometer at 25° C. or 50° C. at a shear rate of 60 l/s to DIN EN ISO 1342.

For the determination of flame retardancy, vertical flame spread on edge flaming was determined by a small burner test based on DIN 53438-2.

In the context of this patent application, the index is understood to mean the ratio of NCO/OH groups.

The hydroxyl number (OH number) means all the OH-functional constituents of the inventive reaction mixture.

Instruments Used:

DSC: DSC Q 20 V24.8 Build 120 instrument from Texas Instruments

Viscometer: MCR 501 from Anton Paar

Example 1

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 minutes. Thereafter, 214 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro(N,N-dimethyloctylamino)boron from Huntsman Corporation, m.p. 25-36° C.), added to the polyol formulation and degassed while stirring at 1 mbar for 5 minutes. Thereafter, the reaction mixture was used to produce a potting compound by transferring the material to a mold preheated to 130° C., and demolding was possible after 15 minutes.

Example 2

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 minutes. Thereafter, 214 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were added, then 478 g of filler (Millisil W12 from Quarzwerke) were incorporated and the entire mixture was degassed at 70° C. Subsequently, 6 g of DY 9577® (trichloro(N,N-dimethyloctylamino)boron from Huntsman Corporation, m.p. 25-36° C.) were added at about 50° C. and the mixture was degassed while stirring at 1 mbar for a further 5 minutes. Thereafter, the reaction mixture was used to produce a potting compound by transferring the mixture to a mold preheated to 130° C., and demolding was possible after 15 minutes.

Comparative Example 3

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 minutes. Thereafter, 214 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 38.5 g of DY 9577® (trichloro(N,N-dimethyloctylamino)boron from Huntsman Corporation, m.p. 25-36° C.), added to the polyol formulation and degassed while stirring at 1 mbar for 5 minutes. Thereafter, the reaction mixture was transferred to a mold preheated to 130° C. The reaction mixture was still not solid even after several hours; demolding was therefore impossible.

Comparative Example 4

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 minutes. Thereafter, 103.6 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro(N,N-dimethyloctylamino)boron from Huntsman Corporation, m.p. 25-36° C.), added to the polyol formulation and degassed while stirring at 1 mbar for 5 minutes. The viscosity of the reaction mixture directly after mixing was 1850 mPas at 25° C. and increased very quickly, which made it impossible to fill the mold homogeneously.

Comparative Example 5

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 minutes. Thereafter, 214 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 2.95 g of Desmorapid DB (N,N-dimethylbenzylamine from Rhein Chemie Rheinau GmbH, liquid at room temperature), added to the polyol formulation and degassed while stirring at 1 mbar for 5 minutes. The viscosity rose very quickly during transfer of the reaction mixture to a mold preheated to 130° C., and so it was impossible to fill the mold homogeneously.

Comparative Example 6

60 g of a polyether polyol having an OH number of 56 mg KOH/g and a functionality of 2 (viscosity at 25° C.: 400±50 mPas; 1,2-propylene glycol as starter; based on propylene oxide) were mixed with 26 g of Eurepox® 710 (bisphenol A epichlorohydrin resin with average molecular weight≤700 g/mol; epoxy equivalent 183-189 g/eq; viscosity at 25° C.: 10 000-12 000 mPas) and 250 ppm of methyl para-toluenesulphonate and degassed at a pressure of 1 mbar for 60 minutes. Thereafter, 20.7 g of Desmodur® VP.PU 60RE11 (polyisocyanate from Bayer MaterialScience AG; mixture of diphenylmethane diisocyanate and polyphenylenepolymethylene polyisocyanate; NCO content 32.6% by weight; viscosity at 25° C.: 20 mPas) were mixed with 6 g of DY 9577® (trichloro(N,N-dimethyloctylamino)boron from Huntsman Corporation, m.p. 25-36° C.), added to the polyol formulation and degassed while stirring at 1 mbar for 5 minutes. The viscosity of the reaction mixture directly after mixing was 2060 mPas at 25° C. and increased very quickly, which made it impossible to fill the mold.

| Examples | 1 (without filler) | 2 (without filler) | 3* (without filler) |
|---|---|---|---|
| Filler content to DIN EN ISO 1172 [% by wt.] | 0 | 61 | 0 |
| NCO/OH equivalents ratio | 12.4 | 12.4 | 12.4 |
| NCO/epoxide equivalents ratio | 11.4 | 11.4 | 11.4 |
| Epoxide/catalyst equivalents ratio | 6.4 | 6.4 | 1 |
| Viscosity (directly after mixing) [mPas] | 120 (25° C.) | 805 (50° C.) | 150 (25° C.) |
| Viscosity (60 min after mixing) [mPas] | 320 (25° C.) | 810 (50° C.) | 350 (25° C.) |
| Viscosity 24 h after mixing (pot life) [mPas] | 340 (25° C.) | 850 (50° C.) | >50000 (25° C.) |
| Cured after [min] | 15 (130° C.) | 15 (130° C.) | did not solidify (130° C.) |
| Fire test (based on small burner test to DIN 53438-2) and flame height [mm] | passed about 60 | passed about 60 | — |
| Glass transition temperature $T_g$ [° C.] to DIN EN ISO 53765 | 146 | 146 | — |
| Modulus of elasticity to DIN ISO 178 [MPa] | 2500 | 8101 | — |
| Flexural strength to ISO 178 [MPa] | 108.6 | 86.9 | — |
| Flexural elongation to ISO 178 [%] | 7.4 | 1.2 | — |
| Specific surface resistivity to DIN IEC 60093 [ohms] | $1.3*10^{17}$ | $3.8*10^{16}$ | — |
| Loss factor tan δ (23° C., 100 V, 50 Hz) | 0.0152 | 0.0235 | — |
| Dielectric constant ϵ (23° C., 100 V, 50 Hz) | 3.94 | 4.32 | — |

*comparative example

| Examples | 4* (without filler) | 5* (without filler) | 6* (without filler) |
|---|---|---|---|
| Filler content to DIN EN ISO 1172 [% by wt.] | 0 | 0 | 0 |
| NCO/OH equivalents ratio | 6.0 | 12.4 | 1.2 |
| NCO/epoxide equivalents ratio | 5.74 | 11.4 | 1.15 |
| Epoxide/catalyst equivalents ratio | 6.4 | 6.4 | 6.4 |
| Viscosity (directly after mixing) [mPas] | 1850 (25° C.) | 150 (25° C.) | 2060 (25° C.) |
| Viscosity (60 min after mixing) [mPas] | 3100 | solid | solid |
| Viscosity 24 h after mixing (pot life) [mPas] | solid | solid | solid |

*comparative examples

Inventive example 1 gives rise to a compact and optically transparent potting compound having very good mechanical properties (modulus of elasticity exceeding 2500 MPa, glass transition temperature of 146° C.). The reaction mixture has a very low viscosity. The part produced in the mold has no defects. It was possible to fill the mold used very quickly and homogeneously. This enables shorter cycle times since the molds are occupied for a shorter time. Advantageously, the pot life in inventive example 1 was more than 24 h. Within this period, there was barely any rise in the viscosity of the system. At 130° C., the casting resin cured very rapidly. No further heat treatment of the inventive potting compound was necessary.

Inventive example 1 was repeated in example 2, with the difference that about 61% by weight of quartz flour (Millisil W12, from Quarzwerke) was added to the reaction mixture. The mechanical properties of the potting compound likewise exhibit very good values. The modulus of elasticity is 8101 MPa and the glass transition temperature 146° C. The quartz flour-filled inventive potting compound additionally exhibits very good electrical values, such as a specific surface resistivity of $3.8*10^{16}$ ohms, a loss factor of tan δ=0.0235 and a dielectric constant of ∈=4.32.

The viscosity in inventive example 2 was very low at about 800 mPas at 50° C. An epoxy resin from Huntsman widely used at present, Araldit® CY225/HY 925/quartz flour exhibits a much higher viscosity of about 10 000 mPas, for example, at a temperature of 50° C. The Huntsman epoxy resin filled with 60% by weight of quartz flour therefore requires potting at higher temperatures. A detailed description of the Huntsman epoxy resin system for electrical potting applications can be found in the application data sheet ®Araldit-Giessharzsystem, Electrical Insulation Material, May 2004 edition.

The starting weights and ratios in comparative example 3 correspond to those from example 1, except that the equivalents ratio of epoxide to latent catalyst has been reduced from 6.4:1 to 1:1 by increasing the amount of catalyst added. The pot life was shortened here by nearly 40%. In addition, the reaction mixture cannot be solidified completely at 130° C. Even after 60 minutes at 130° C., the material is partly in uncrosslinked form. It was not possible to produce a finished potting compound. It was therefore also impossible to ascertain any further mechanical and electrical properties.

In comparative example 4, compared to inventive example 1, the NCO/OH equivalents ratio was reduced from 12.4 to 6, by reducing the amount of isocyanate used (Desmodur® VP.PU 60RE11). Correspondingly, the NCO/epoxide equivalents ratio was reduced from 11.4 to 5.74. As a result of the reduction in the NCO/OH equivalents ratio, the starting viscosity was about 1850 mPas at 25° C., and hence made it impossible to fill the heated mold homogeneously, without defects. Moreover, the system from comparative example 4 did not have the long open pot life of more than 24 hours at room temperature as in inventive example 1, but was solid after 4 hours. It was not possible to produce a finished potting compound. It was therefore also impossible to ascertain any further mechanical and electrical properties.

The starting weights and ratios in comparative example 5 corresponded to those from example 1, except that, rather than the latent Dy 9577® catalyst, a corresponding molar amount of non-latent catalyst was used, in this case Desmorapid DB. In this case too, the viscosity of the reaction mixture rose very rapidly, which made it impossible to fill the heated mold homogeneously, without defects. The open pot life was shortened here to just 25 min, and was thus more than 23 hours shorter than in inventive example 1. It was not possible to produce a finished potting compound. It was therefore also impossible to ascertain any further mechanical and electrical properties.

In comparative example 6, compared to inventive example 1, the NCO/OH equivalents ratio was reduced from 12.4 to 1.2, by reducing the amount of isocyanate used (Desmodur® VP.PU 60RE11). Correspondingly, the NCO/epoxide equivalents ratio was reduced from 11.4 to 1.15. As a result of the reduction in the NCO/OH equivalents ratio, the starting viscosity was about 2060 mPas at 25° C. and rose very significantly within a few minutes, and hence made it impossible to fill the heated mold homogeneously. Moreover, the system from comparative example 6 had only a very short open pot life of less than 12 minutes. It was not possible to produce a finished potting compound. It was therefore also impossible to ascertain any further mechanical and electrical properties.

The very good mechanical and electrical indices in combination with a very low viscosity, constant over a long period, of the casting resin and only a very short curing time, which leads to high productivity in the production of potting compounds or components, were achieved only with the inventive examples.

In the case of inventive examples 1 and 2, self-extinguishment occurred 55 seconds after the flame was removed, and the flame height was max. 60 mm.

The invention claimed is:

1. A potting compound based on polyisocyanurate and on polyurethane, wherein the polyurethane and polyisocyanurate are obtained from a reaction mixture consisting of A) one or more polyisocyanates, B) one or more polyols, C) one or more polyepoxides, D) one or more latent catalysts and E) optionally additives, and F) optionally fillers, wherein the reaction mixture without fillers has a viscosity at 25° C. of 50 to 400 mPas, measured to DIN EN ISO 1342, a ratio of the number of NCO groups in component A) to the number of OH groups in component B) of 11:1 to 14:1, a ratio of the number of NCO groups in component A) to the number of epoxy groups in component C) of 7:1 to 15:1, and a ratio of the number of epoxy groups in component C) to the number of moles of latent catalyst in component D) of 3:1 to 10:1.

2. The potting compound according to claim 1 wherein the reaction mixture without fillers has a viscosity at 25° C. of 60 to 350 mPas as measured to DIN EN ISO 1342, a ratio of the number of NCO groups in component A) to the number of epoxy groups in component C) of 10:1 to 14:1, and a ratio of the number of epoxy groups in component C) to the number of moles of latent catalyst in component D) of 5:1 to 7:1.

* * * * *